(12) United States Patent
Schmid et al.

(10) Patent No.: US 7,047,200 B2
(45) Date of Patent: May 16, 2006

(54) VOICE RECOGNITION STATUS DISPLAY

(75) Inventors: Philipp H Schmid, Mercer Island, WA (US); Marieke Iwema, Seattle, WA (US); Robert L Chambers, Sammamish, WA (US); Adrian Garside, Sammamish, WA (US)

(73) Assignee: Microsoft, Corporation, Redmond, WA (US)

( * ) Notice: Subject to any disclaimer, the term of this patent is extended or adjusted under 35 U.S.C. 154(b) by 859 days.

(21) Appl. No.: 10/155,861

(22) Filed: May 24, 2002

(65) Prior Publication Data

US 2003/0220798 A1 Nov. 27, 2003

(51) Int. Cl.
*G10L 21/00* (2006.01)

(52) U.S. Cl. .............. 704/277; 704/270; 704/276

(58) Field of Classification Search ......... 704/270, 704/277, 276
See application file for complete search history.

(56) References Cited

U.S. PATENT DOCUMENTS

| | | | | |
|---|---|---|---|---|
| 5,844,158 A | * | 12/1998 | Butler et al. | 84/650 |
| 5,864,815 A | * | 1/1999 | Rozak et al. | 704/275 |
| 5,930,751 A | * | 7/1999 | Cohrs et al. | 704/231 |
| 5,949,886 A | * | 9/1999 | Nevins et al. | 381/57 |
| 6,075,534 A | * | 6/2000 | VanBuskirk et al. | 715/835 |
| 6,212,498 B1 | * | 4/2001 | Sherwood et al. | 704/244 |
| 6,266,571 B1 | * | 7/2001 | Fado et al. | 700/94 |
| 6,336,091 B1 | * | 1/2002 | Polikaitis et al. | 704/233 |
| 6,697,777 B1 | * | 2/2004 | Ho et al. | 704/235 |

* cited by examiner

*Primary Examiner*—Wayne Young
*Assistant Examiner*—Michael N. Opsasnick
(74) *Attorney, Agent, or Firm*—Banner & Witcoff, Ltd.

(57) ABSTRACT

A user interface is described that informs the user as to the status of the operation of a voice recognition application. The user interface displays an indicator, such as a volume bar, each time that the voice recognition application records and identifies a volume event. The user interface also displays an indicator when the voice recognition application recognizes a volume event corresponding to a displayed volume event indicator. The interface thus confirms to a user that the voice recognition application is both recording and recognizing the words being spoken by the user. It also graphically informs the user of the delay the application is currently experiencing in recognizing the words that the user is speaking.

23 Claims, 11 Drawing Sheets

VOICE RECOGNITION STATUS DISPLAY

FIELD OF THE INVENTION

The present invention relates to a user interface that provides a user with feedback as to the status of a voice recognition process. More particularly, the present invention provides a user interface that indicates when a voice recognition process identifies volume events, and then subsequently indicates when the voice recognition process recognizes those volume events.

BACKGROUND OF THE INVENTION

Speech is perhaps the oldest form of human communication, and many scientists now believe that the ability to communicate through speech is inherently provided in the biology of the human brain. It thus has been a long-sought goal to allow users to communicate with computers using speech, and great strides recently have been made in obtaining this goal. For example, some computers now include speech recognition applications that allow users to speak aloud both commands for operating the computer and dictation to be converted into text. These applications periodically record sound samples taken through a microphone, analyze the samples to recognize the phonemes being spoken by the user, and identify the words made up by the spoken phonemes.

While speech recognition is becoming commonplace, there are still some disadvantages to using conventional speech recognition applications. With human interaction, people control their speech based upon the reaction that they perceive in a listener. For example, a listener may nod or make vocal responses, such as "yes" or "uh-huh," to indicate that he or she understands what is being said to them. On the other hand, a listener may take on a quizzical expression, lean forward, or give other vocal or non-vocal cues if the listener does not understand what is being said. Based upon these responses, a speaker will speak more slowly, more loudly, pause more frequently, or repeat a statement, usually without the listener even realizing that he or she is changing they way they are speaking.

Unfortunately, conventional voice recognition applications do not provide these responses to speech. Some voice recognition applications may display various indicators to show a user when the application is recording. For example, some voice recognition applications may display a "microphone on" indicator when the application is recording sound samples, and a "microphone off" indicator when the application has stopped recording sound samples. Some voice recognition software applications may also employ a volume indicator, to graphically show a user the level at which the application is recording sound samples. Further, some voice recognition applications may even provide an indicator after a phrase of speech has been recognized, to inform the user as to whether or not the recognition process was successful or unsuccessful. Thus, these voice recognition applications may display the phrase "please repeat that" if a phrase has not been properly recognized, or display the recognized phrase when it has been recognized. None of these indicators, however, gives the user any sign as to whether or not the voice recognition application is recognizing a phrase while the user is still speaking that phrase.

This is a particularly significant disadvantage for conventional voice recognition applications, as they will generally experience a substantial lag time between the user speaking a phrase and when the application recognizes that phrase. In order to recognize spoken commands, for example, a voice recognition application will usually employ a grammar library. This grammar library contains the sequence of words (which are themselves expressed as a sequence of phonemes) that make up each command that can be given through the voice recognition application. Before the voice recognition application will begin the recognition process for a phrase, it will first match a recorded sound with the initial phoneme of a command in the grammar library. Only after the voice recognition application determines that the user has begun to speak the first phoneme of an actual command will it then start the recognition process for subsequent sounds spoken by the user.

As the recognition process continues, the voice recognition application will typically catch up in recognizing the words of the phrase being spoken by the user. For example, with voice recognition applications that employ a cache memory, the recognition process will become quicker as more speech data is loaded into the cache. Also, subsequent sounds in a command phrase may be more quickly recognized if the phrase has few word alternatives. Each time the user completes a phrase and begins speaking a new phrase, however, there is a new delay in the recognition process.

These delays in the speech recognition process create a significant problem with most users. As the speech recognition application delays in recognizing input sounds, the typical user will become uncertain as to whether the speech recognition application is working. In response, the typical user will often begin to speak more slowly, more loudly, or both. This detracts from the accuracy of the recognition process, which is calibrated to recognize speech at conversational volumes and at normal speeds. Even worse, the user may repeat a phrase, causing the phrase to be recognized twice. As the accuracy of the recognition process decreases, the typical user will speak still more slowly, more loudly, or become more repetitive, making the accuracy even worse. This cycle will continue until the user becomes too frustrated to continue employing the voice recognition application.

SUMMARY OF THE INVENTION

Accordingly, there is a need for a voice recognition user interface that provides the user with feedback indicating the status of the operation of a voice recognition application. The present invention advantageously provides a user interface that informs the user as to the status of the operation of a voice recognition application. More particularly, the invention displays an indicator, such as a volume bar, each time that the voice recognition application records and identifies a volume event. The invention also displays an indicator when the voice recognition application completes the recognition of a volume event corresponding to a displayed volume event indicator. The interface thus confirms to a user that the voice recognition application is both recording and recognizing the words being spoken by the user. It also graphically informs the user of the delay the application is currently experiencing in recognizing the words that the user is speaking.

BRIEF DESCRIPTION OF THE DRAWINGS

The foregoing summary of the invention, as well as the following detailed description of preferred embodiments, will be better understood when read in conjunction with the accompanying drawings.

DETAILED DESCRIPTION OF PREFERRED EMBODIMENTS

Overview

The present invention relates to a user interface that indicates the status of the operation of a voice recognition application. A user interface according to the invention may be implemented with, for example, instructions that can be executed on a computing device. Accordingly, an exemplary computing environment for executing such instructions will be described. The components and functions of a user interface according to the invention will be described in detail as well. As will be apparent from these descriptions, the user interface according to the invention may operate under two different situations. In a first situation, the user interface responds to background noise, before the user has begun speaking a phrase to be recognized. In the second situation, the user interface will respond to sounds making up a phrase that the voice recognition application should recognize. Accordingly, the operation of a user interface in both of these situations will be discussed in detail below.

Exemplary Operating Environment

As previously noted, the voice recognition application feedback user interface of the invention may be implemented using software. That is, the user interface may be described in the general context of computer-executable instructions, such as program modules, executed by one or more computing devices. Generally, program modules include routines, programs, objects, components, data structures, etc. that perform particular tasks or implement particular abstract data types. Typically the functionality of the program modules may be combined or distributed as desired in various embodiments.

Figure 1:
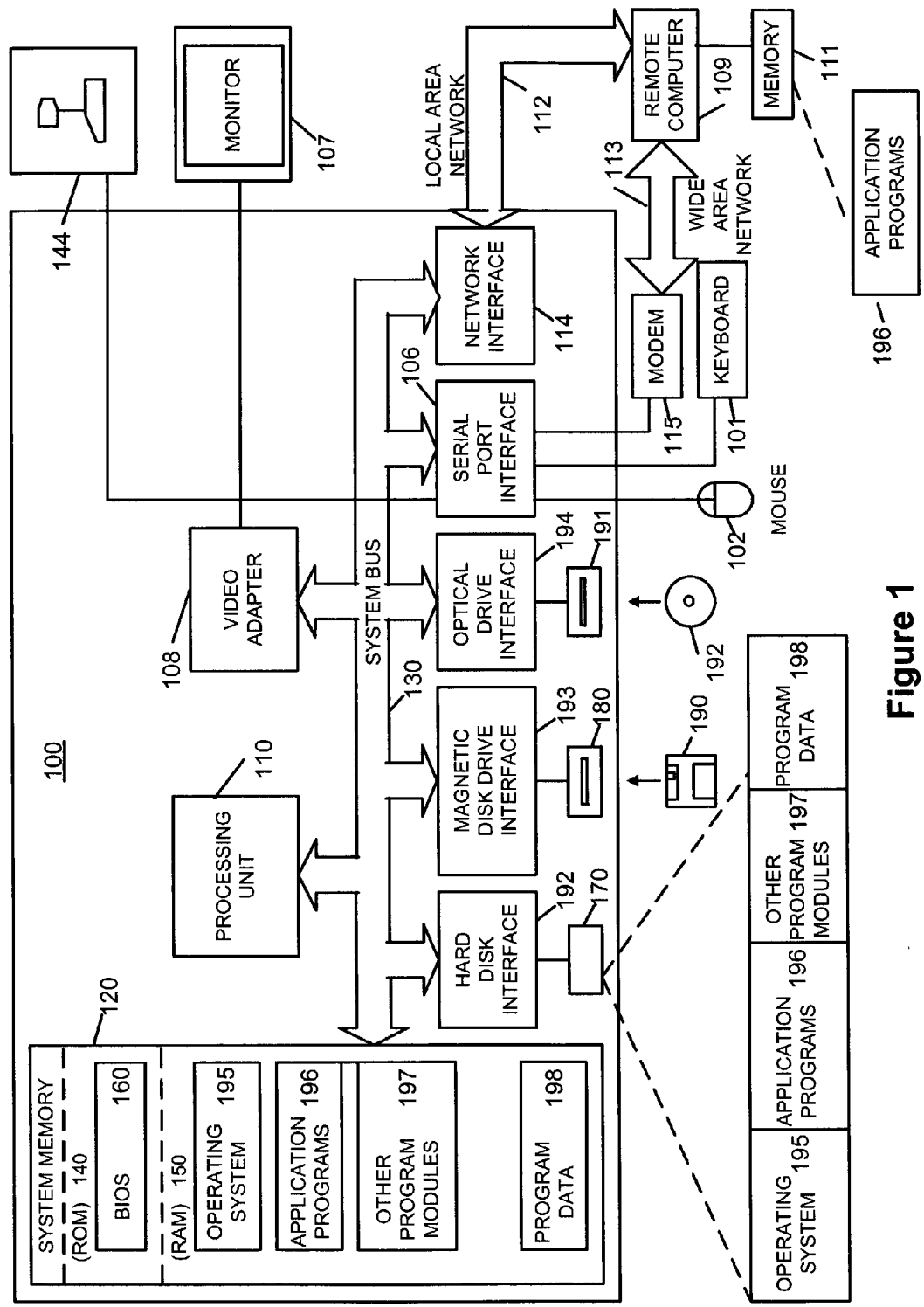
FIG. 1 shows a schematic diagram of a general-purpose digital computing environment that can be used to implement various aspects of the invention.

Because the invention may be implemented using software, it may be helpful for a better understanding of the invention to briefly discuss the components and operation of a typical programmable computer on which various embodiments of the invention may be employed. Such an exemplary computer system is illustrated in FIG. 1. The system includes a general-purpose computer 100. This computer 100 may take the form of a conventional personal digital assistant, a tablet, desktop or laptop personal computer, a network server or the like.

Computer 100 typically includes at least some form of computer readable media. Computer readable media can be any available media that can be accessed by a processing unit 110. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processing unit 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connections, and wireless media such as acoustic, RF, infrared and other wireless media. Combinations of any of the above should also be included within the scope of computer readable media.

The computer 100 typically includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150. A basic input/output system 160 (BIOS), containing the basic routines that help to transfer information between elements within the computer 100, such as during start-up, is stored in the ROM 140.

The computer 100 may further include additional computer storage media devices, such as a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100.

Although the exemplary environment described herein employs a hard disk drive 170, a removable magnetic disk drive 180 and a removable optical disk drive 191, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Also, it should be appreciated that more portable embodiments of the computer 100, such as a tablet personal computer or personal digital assistant, may omit one or more of the computer storage media devices discussed above.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through various input devices, such as a keyboard 101 and a pointing device 102. As previously noted, the invention is directed to a user interface for a voice recognition application. Accordingly, the computing device 120 will also include a microphone 144 through which a user can input speech information. Additional input devices may also include, for example, a digitizer, a joystick, game pad, satellite dish, scanner, touch pad, touch screen, or the like.

These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device. Of course, it will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

The User Interface

Figure 2:
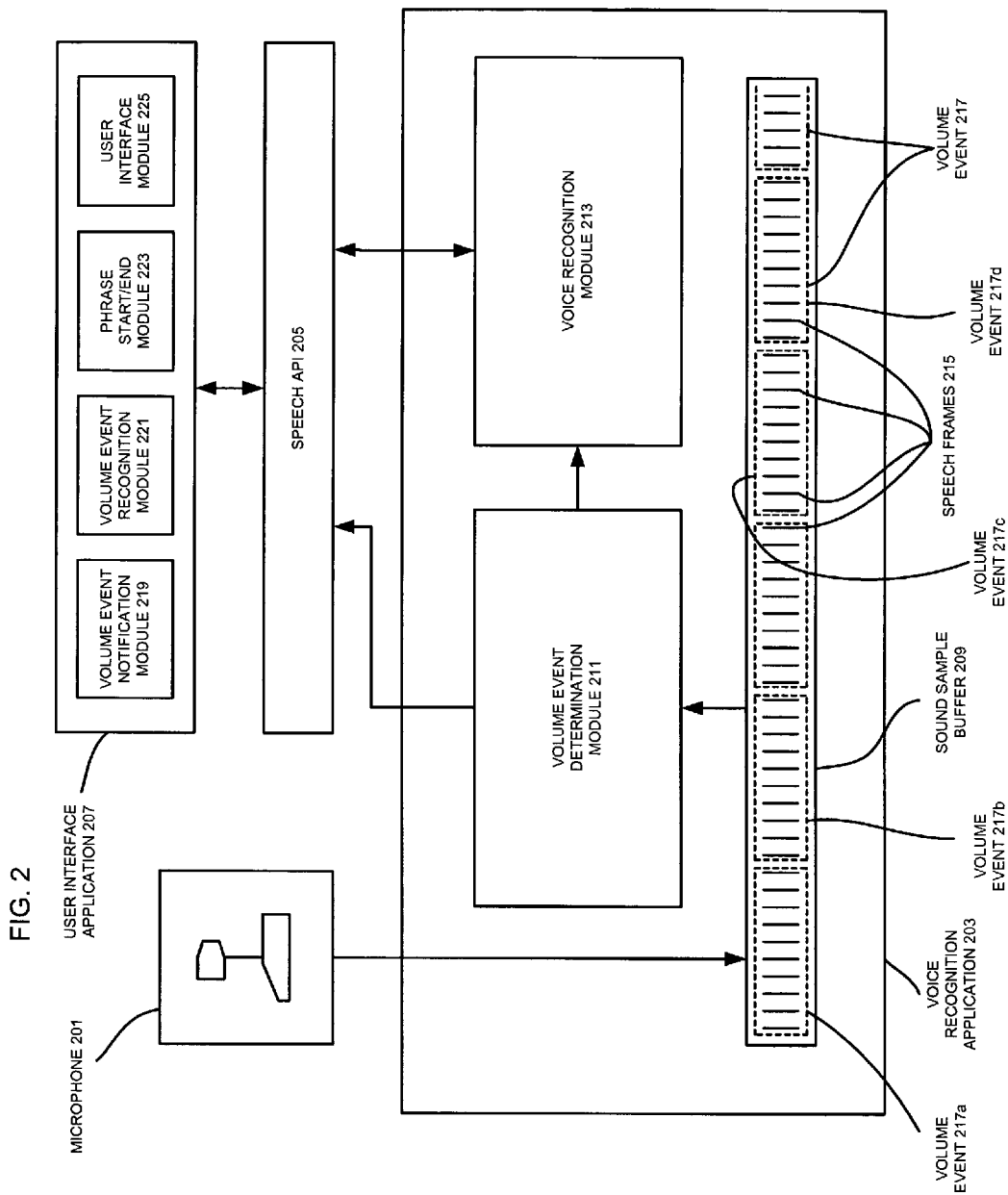
FIG. 2 illustrates components of a voice recognition application employing the feedback user interface according to an embodiment of the invention.

FIG. 2 illustrates a voice recognition system employing a feedback user interface according to one embodiment of the invention. The system includes a microphone 201 and a voice recognition application 203. The system also includes a speech application program interface (API) 205 and the feedback user interface application 207 of the invention. As will be appreciated by those of ordinary skill in the art, the speech API 205 may be implemented using any suitable application program interface or other middleware for exchanging data between the voice recognition application 203 and the feedback user interface 207. For example, the speech API 205 can be implemented using the Speech API 5.1 software available from Microsoft Corporation. The voice recognition application 203 includes a sound sample buffer 209, a volume event determination module 211, and a voice recognition module 213. The buffer 209 is a circular buffer that stores sound samples obtained from the microphone 201. The buffer 209 may be implemented using, for example, a read/write microcircuit memory device that can quickly store and retrieve the sound samples.

As is known in the art, the pressure from local sound waves will push a membrane in the microphone 201 away from its normal position, and the microphone will generate a positive or negative electrical signal corresponding to the membrane's movement. The voice recognition application 203 (or an audio subsystem employed by the voice recognition application 203) will then periodically sample the electrical signal from the microphone to generate a single positive or negative value corresponding to the distance of the membrane from its normal position. The voice recognition application 203 may, for example, sample the electrical signal at a rate of 16 kHz (that is, 16,000 times per second). The sound samples are then recorded in the buffer 209.

In the illustrated embodiment, the sound samples are collected into groups 10 milliseconds long, referred to as speech frames 215. Each speech frame 215, represented by a short vertical line in FIG. 2, may therefore contain 160 sound samples. Together, the sample values in a speech frame 215 correspond to the waveform of sound measured by the microphone 201. Thus, the sample values in a speech frame 215 can be Fourier transformed to determine the energy distribution of the recorded sound wave over a frequency range. Moreover, the square of each sample value in a speech frame 215 can be summed to determine the power of the recorded sound wave during the period of the speech frame 215.

As shown in FIG. 2, sequences of ten speech frames 215 are then organized into volume events 217. Thus, in the illustrated embodiment, each volume event 217 is 100 milliseconds long. As will be discussed in detail below, a volume event 217 serves as a convenient unit on which to base visual feedback to a user regarding the operation of the voice recognition application 203. Of course, the definition of a volume event 217 as a sequence of ten speech frames 215 can be modified as desired. For example, if it was desirable to provide more rapid feedback to a user, then each volume event 217 could correspond to a single speech frame 215. If however, a slower feedback rate was preferred, then the volume event 217 could be defined as a sequence of 20, 50, or even 100 or more speech frames 215, as desired.

As will be appreciated by those of ordinary skill in the art, the voice recognition module 213 analyzes each speech frame 215 to determine if it corresponds to part of a phoneme. Phonemes are the smallest discrete sounds making up a spoken language. Thus, the word "pit" starts with the phoneme /p/, while the similar-sounding word "bit" instead begins with the phoneme /b/. Typically, phonemes are at least one speech frame 215 long (that is, 10 milliseconds long) and can be as long as 16 speech frames 215 (that is, 160 milliseconds long). When speaking the word "bit," for example, then the buffer 209 may record approximately 480 sound samples (that is, three speech frames 215) corresponding to the phoneme /b/ before measuring a sound sample that corresponds to the next phoneme in the word (that is, the phoneme /I/). On the other hand, if the user makes the /p/ sound, the buffer 209 may record 960 sound samples (that is, about six speech frames 215) corresponding to this sound before measuring the first sound sample that corresponds to the subsequent phoneme /I/.

The volume event determination module 211 determines when a group of sound samples forms a single volume event 217. For example, the volume event determination module 211 may periodically retrieve the oldest 256 sound samples from the buffer 209, and pass those sound samples onto the voice recognition module 213 for recognition. The volume event determination module 211 will keep a running tally of the number of sound samples it retrieves, and identify a volume event 217 when it has retrieved the designated number of sound samples making up a volume event 217 (in this embodiment, 1600 sound samples). As will be discussed in detail below, it also notifies the user interface 207 of the volume event 217.

The voice recognition module 213 then performs a recognition process on the sound samples provided by the volume event determination module 211. That is, the voice recognition module 213 analyzes various characteristics of each speech frame 215, such as pitch, volume, and tremor. The voice recognition module 213 may, for example, perform a frequency analysis of each speech frame 215 using Fourier transforms and Hidden Markov Model algorithms, or any other suitable frequency analysis techniques. The voice recognition module 213 then compares these characteristics with the characteristics of model phonemes in a recognition dictionary.

Based on this comparison, the voice recognition module 213 will determine the probability that the sound captured in a speech frame 215 corresponds to a phoneme in the recognition dictionary. If the probability is sufficiently high, then the voice recognition module 213 will conclude that the speech frame 215 matches that phoneme. The voice recognition module 213 may also take into account the characteristics of the preceding and subsequent speech frames 215. For example, if the preceding two speech frames 215 correspond to the first two parts of a phoneme, then the voice recognition module 213 may be more likely to determine that the present speech frame 215 matches the third part of the phoneme. If, however, the preceding two speech frames do not correspond to sequential parts of a phoneme, then the voice recognition module 213 may be less likely to determine that the present speech frame 215 matches a middle part of that phoneme. Similarly, if the subsequent two speech frames correspond to sequential parts of a phoneme, the voice recognition module 213 will be more likely to determine that the present speech frame 215 matches an earlier part of the phoneme. If, however, the subsequent two speech frames 215 to not correspond to sequential parts of a phoneme, then the voice recognition module 213 will be less likely to determine that the present speech frame 215 matches an initial part of that phoneme.

By matching the speech frames 215 with model phonemes, the speech recognition module 213 recognizes the words being spoken by a user. That is, the speech recognition module 213 compares the phonemes matching the speech frames 215 with the phonemes making up each word in the recognition dictionary. When the voice recognition module 213 determines that the phonemes matching the speech frames 215 also correspond to phonemes making up a word in the recognition dictionary, the speech recognition module 213 recognizes that the speech frames 215 have recorded the user speaking that word.

The voice recognition module 213 also determines if a speech frame 215 starts or ends a phrase. If the user is employing the voice recognition application 203 to recognize a spoken command, then the voice recognition module 213 may make this determination based upon a grammar library. The grammar library may be, for example, a table or tree structure that contains the phonemes, in order of occurrence, for each command that the voice recognition application 203 will recognize. Thus, even after the voice recognition application 203 has begun recognizing speech frames 215, it will not determine that the user has started speaking a phrase to be recognized until a speech frame 215 matches the first phoneme of a command in the grammar library. If the user is employing the voice recognition application 203 for dictation, the voice recognition module 213 may determine that a phrase has started when, for example, a speech frame 215 matches a phoneme in the recognition dictionary after a period during which the speech frames 215 do not correspond to phonemes (that is, when the sound samples do not correspond to a spoken word, but instead reflect background noise). Alternately, the voice recognition module 213 may determine that a phrase started after the user has spoken the word "period" to dictate punctuation, or otherwise provided phrase-ending punctuation.

Once the voice recognition module 213 has recognized the start of a phrase, it can recognize when the end of the phrase has occurred. If the voice recognition application 203 is being used to recognize commands, for example, the voice recognition module 213 may recognize the end of a phrase when a sequence of recognized speech frames 215 has matched each phoneme in a command, or if there is a long absence of speech frames 215 that match the phonemes in the command. If, however, the voice recognition application 203 is being used for dictation, the voice recognition module 213 may recognize the end of a phrase if there is a long pause in speech frames 215 that match a phoneme in the recognition dictionary.

Turning now to the user interface application 207, it includes a volume event notification module 219 and a volume event recognition module 221. The user interface application 207 also has a phrase/start end module 223 and a user interface module 225. As will be discussed in detail below, when the volume event determination module 211 in the voice recognition application 203 identifies a volume event 217, it notifies the volume event notification module 219 in the user interface application 207. It also provides the volume event notification module 219 with the volume level of the volume event 217, which may be obtained by, for example, averaging the power of each speech frame 215 making up the volume event 217. When the voice recognition module 213 determines that a phrase has started or ended, it notifies the phrase start/end module 223 in the user interface application 207 of the phrase start or end, respectively. Further, after a phrase has started, when the voice recognition module 213 in the voice recognition application 203 completes the recognition process for the last speech frame 215 in a volume event 217 within that phrase, it notifies the volume event recognition module 221 in the user interface application 207.

Figure 5A:
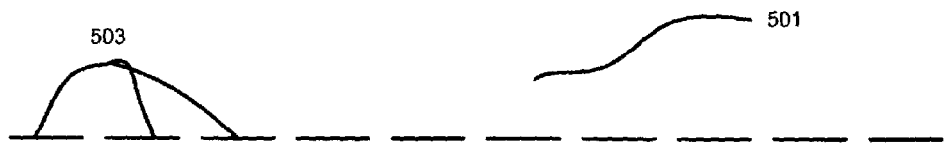
FIGS. 5A–5F show various displays provided by the feedback user interface according to an embodiment of the invention.
Figure 5B:
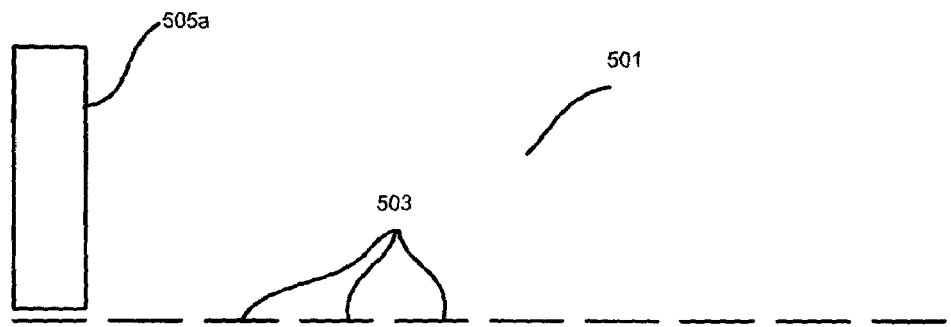
Figure 5C:
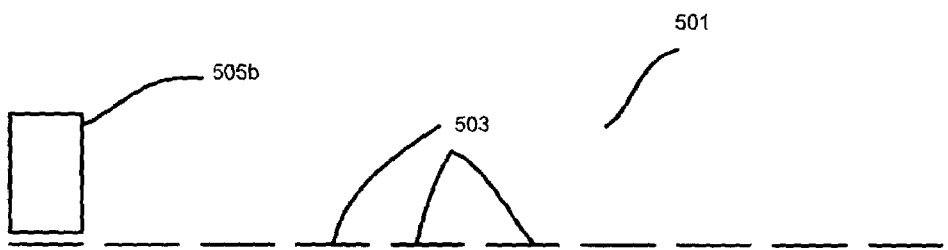

The user interface module 225 in the user interface application 207 renders a user interface display (hereafter referred to simply as the "display") based upon the information received by the volume event notification module 219, the volume event recognition module 221, and the phrase start/end module 223. Referring briefly to FIG. 5A, the display 501 includes a plurality of slots 503. When the volume event notification module 219 receives a volume event notification from the volume event determination module 211, the user interface module 225 displays a volume event occurrence indicator 505 in the display 501. For example, the user interface module 225 may render a volume bar 505 corresponding to the volume level of the volume event 217. FIGS. 5B and 5C illustrate examples of volume bars 505a and 505b, respectively, corresponding to volume events 217a and 217b having different volume levels.

Figure 5D:
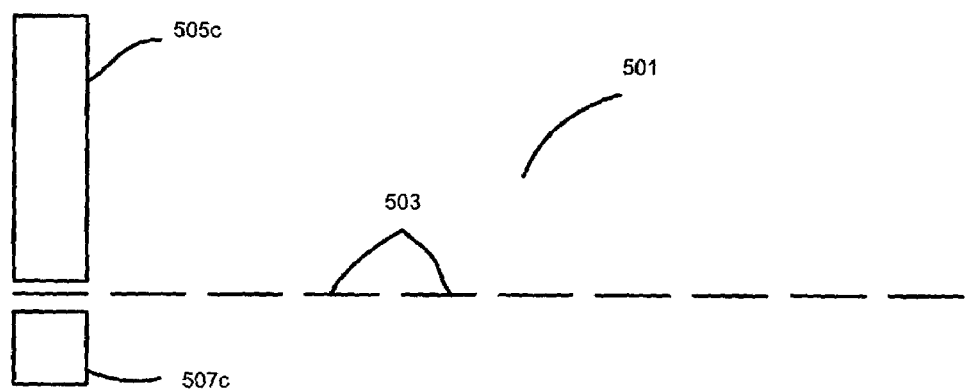

Similarly, if the volume event recognition module 221 receives a notification from the voice recognition module 213, the user interface module 225 may display a volume recognition indicator 507 proximal to the volume event occurrence indicator corresponding to the recognized volume event 217. More particularly, if the volume event recognition module 221 receives a notification from the voice recognition module 213 for a volume event 217 having a corresponding volume bar 505 displayed in the display 501, the user interface module 225 also will display a volume event recognition bar 507 underneath that volume bar 505 as shown in FIG. 5D. If however, the volume event recognition module 221 receives a notification from the voice recognition module 213 for a volume event 217 that does not have a corresponding volume bar 505 displayed in the display 501, then the user interface module 225 will simply ignore the notification. As will also be explained in detail below, the phrase start/end module 223 determines if the user interface module 225 erases a previously-displayed volume bar 505 before displaying a new volume bar 505, or if it displays a new volume bar 505 in a slot adjacent to a previously-displayed volume bar 505.

Operation Of The Event Volume Determination Module With The User Interface

Figure 3A:
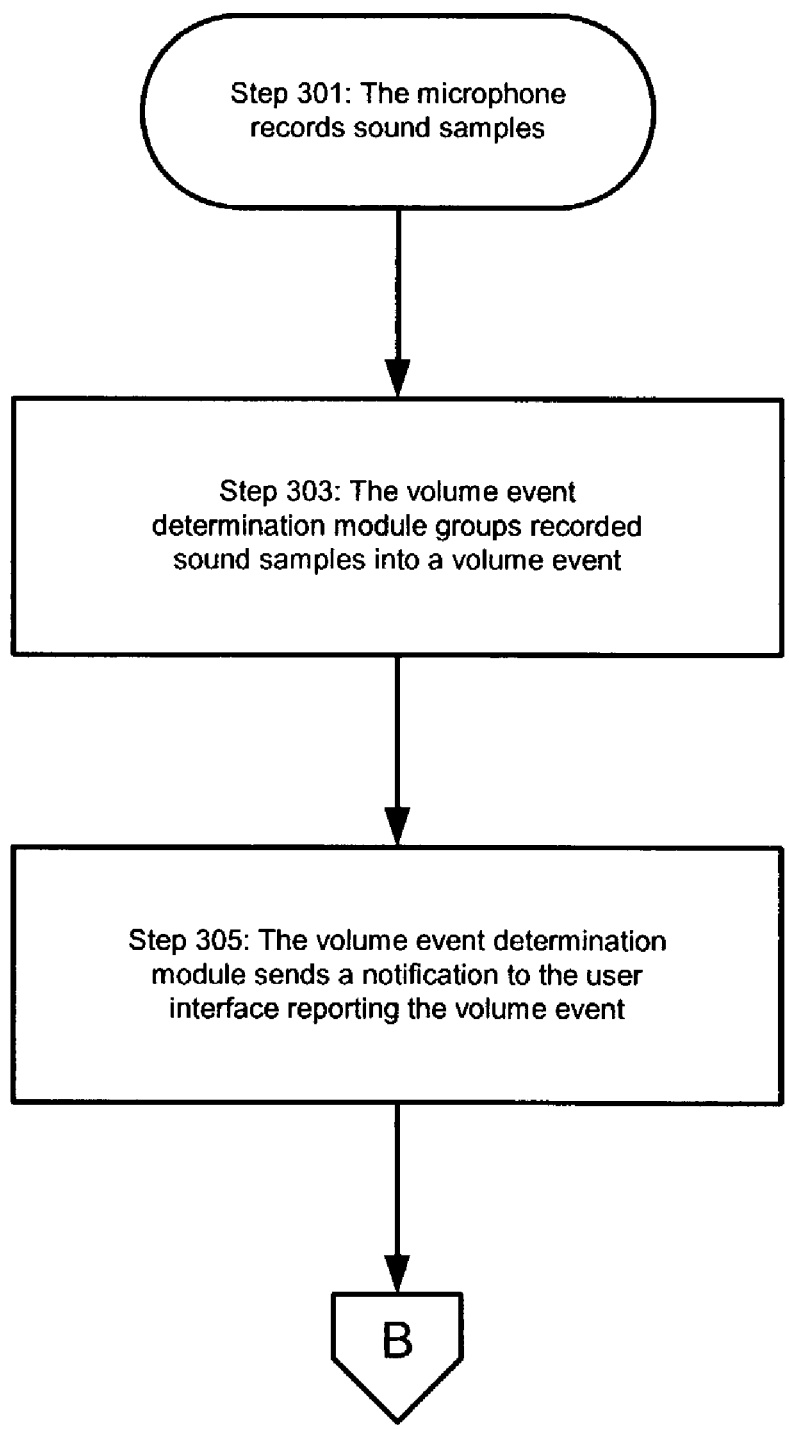
FIGS. 3A–3C show flowcharts illustrating the operation of the voice recognition application illustrated in FIG. 2 with respect to the volume event determination module.
Figure 3B:
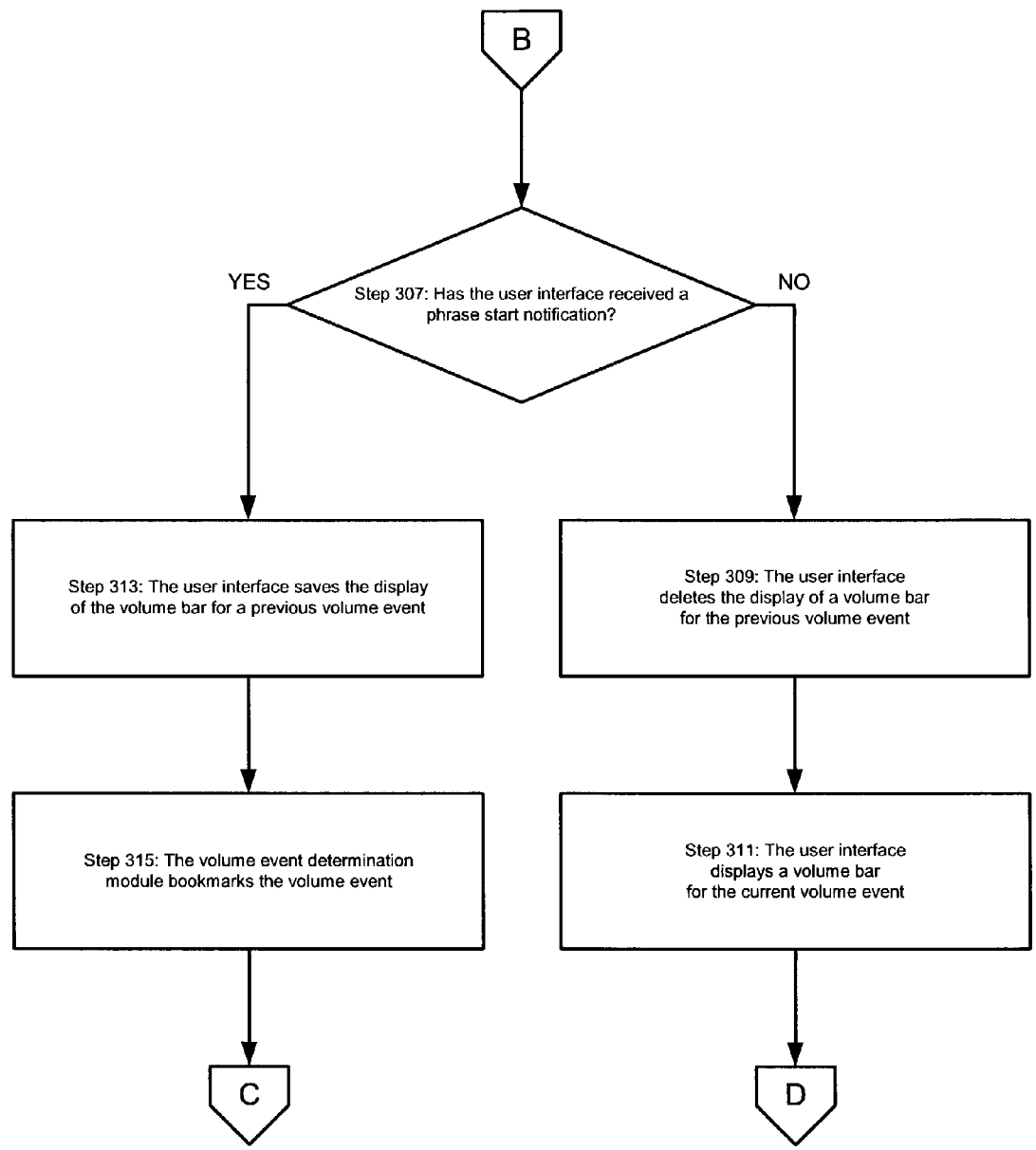
Figure 3C:
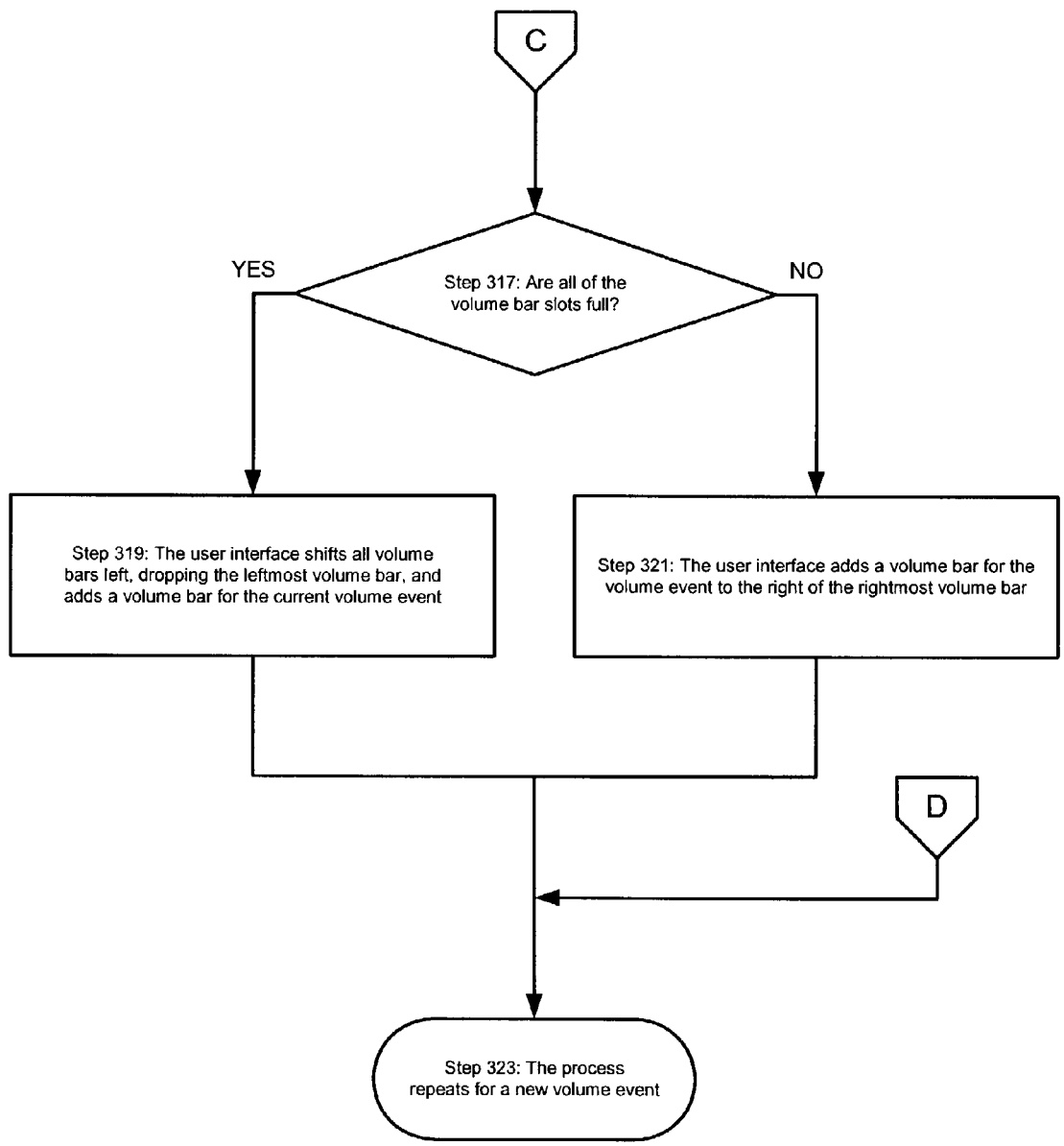

The operation of the volume event determination module 211 with regard to the user interface application 207 will now be explained with reference to FIGS. 3A–3C and 5A–5F. Referring first to FIG. 3A, in step 301 the operation of the voice recognition application 203 starts when the microphone 201 begins recording sounds. As previously noted, the sound samples from the sounds recorded by the microphone 201 are collected in the sound sample buffer 209. Next, in step 303, the volume event determination module 211 determines that a group of sound samples (or speech frames 215 made up of individual sound samples) forms a volume event 217 (referred to hereafter as the "current" volume event 217 for consistency and simplicity). In the illustrated embodiment, a volume event 217 is made up of 1600 sound samples (that is, 10 speech frames 215), but alternate embodiments of the invention may define a volume event 217 as containing fewer or more sound samples as desired.

In step 305, the volume event determination module 211 notifies the user interface application 207 of the current volume event 217. More particularly, the volume event determination module 211 provides a notification to the speech API 205, which then relays the notification to the volume event notification module 219. This notification regarding a volume event 217 may be implemented using, for example, a subscription process. With such a subscription process, the user interface application 207 sends a subscription request to the speech API 205 upon initialization. The speech API 205 in turn relays the request to the voice recognition application 203. After receiving the request, the volume event determination module 211 will periodically decide if it has identified a volume event 217 from the sound samples. For example, in the illustrated embodiment, the volume event determination module 211 may cheek every 100 milliseconds to determine if it has identified sufficient speech frames to make up a new volume event 217. If the volume event determination module 211 has identified a group of speech frames 215 constituting a volume event 217 within the most recent 100 millisecond period, then it sends a notification identifying those speech frames 215 to the volume event notification module 219 via the speech API 205.

After the volume event notification module 219 receives a notification of the volume event 217, in step 307 the user interface application 207 determines if the phrase start/end module 223 has already received a phrase start notification from the voice recognition application 203. If the phrase start/end module 223 has not yet received a phrase start notification, then in step 309 the user interface module 225 deletes any pre-existing volume bars 505 from the display interface 501. That is, if the volume event determination module 211 previously has identified a volume event 217, then the user interface module 225 deletes the volume event occurrence indicator 505 corresponding to that previous volume event 217 in step 309. If the current volume event is the first volume event detected by the volume event determination module, there will be no previous volume event occurrence indicator 505 to delete from the display 501. Then, in step 311, the user interface module 225 renders a new volume event occurrence indicator 505 corresponding to the current the volume event 217. Skipping on to step 323, the process repeats for subsequent sound samples recorded by the microphone 201.

On the other hand, if the phrase start/end module 223 has previously received a phrase start notification from the voice recognition module 213, the operation of the user interface module 225 proceeds to step 313, where the user interface module 225 saves the display of the volume event occurrence indicator 505 for any immediately preceding volume event 217. Then, in step 315, the volume event notification module 219 bookmarks the current volume event 217 with the volume event determination module 211. For example, the volume event determination module 211 may associate a specific identification code (which may be provided by the volume event notification module 219) with the last speech frame 215 in the volume event 217. Of course, other techniques for identifying the volume event 217 other than a bookmark may also be employed. As will be apparent from the subsequent discussion, this bookmark process allows the user interface module 225 to later match a volume event occurrence indicator 505 associated with the current volume event to a volume event recognition indicator 507 corresponding to that current volume event 217.

Next, in step 317, the user interface module 225 determines if there is any area available in display 501 for rendering a new volume event occurrence indicator 505 corresponding to the current volume event 217. For example, with the display 501 illustrated in FIGS. 5A, there are ten slots 503 in which the user interface module 225 can place a volume event occurrence indicator 505. Thus, in step 317, the user interface module 225 determines if there are any empty slots 503 above which a volume bar 505 corresponding to the current volume event 217 can be rendered.

Figure 5E:
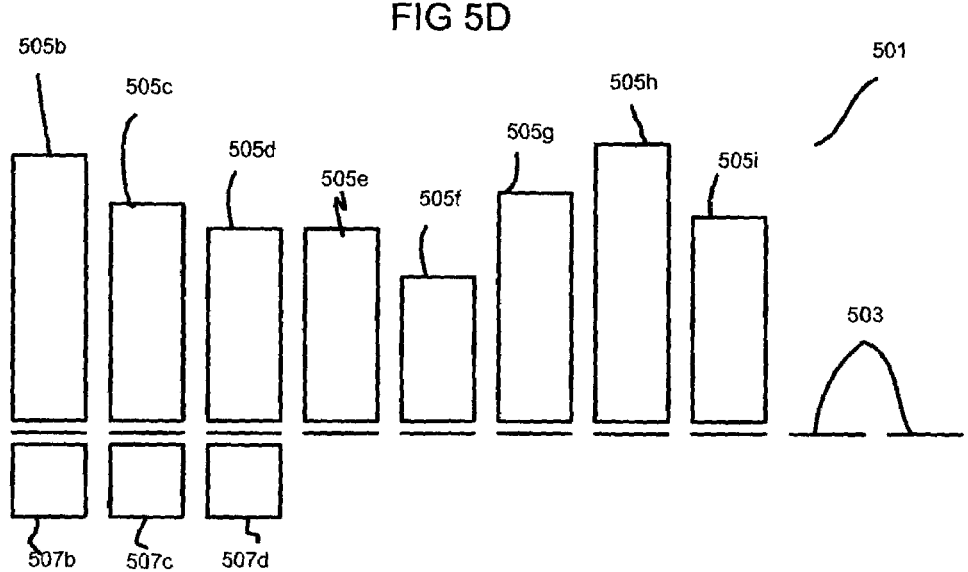
Figure 5F:
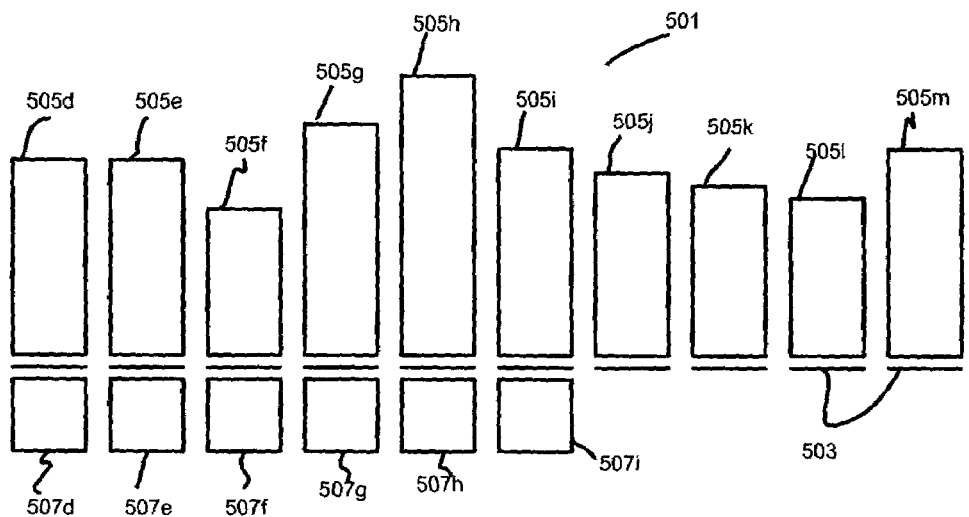

If all the slots 503 in the display 501 are full, in step 319 the user interface module 225 shifts all of the volume bars left, dropping the leftmost volume bar 505 and adding a new volume bar 505 corresponding to the current volume event 217 in the rightmost slot 503. For example, as illustrated in FIG. 5E, the display 501 has the volume bar 505i positioned above the eighth slot 501 from the left. As each of volume bars 505*l* and 505*m* were added to display 501, however, the volume bars 505*b* and 505*c* were deleted from the display 501. Further, volume bar 505*a*–505*i* were shifted two slots 501 to the left, resulting in the arrangement shown in FIG. 5F. Thus, if the user interface module 225 were to add a new volume bar 505 to the display 501 as shown in FIG. 5F, it would delete the volume bar 505*d*, and shift each of volume bars 505*e*–505*m* to the left. The user interface module 225 would then render the new volume bar 505 in the rightmost slot 503. On the other hand, if the display 501 already includes an available slot 503, in step 319 the user interface module 225 simply adds a volume bar 505 for the current volume event 217 to the right of the rightmost existing volume bar 505 in step 321. Then, in step 323, the process repeats for speech frames 215 subsequently recorded by the microphone 201.

Thus, regardless of state of the display 501, the user interface module 225 displays a volume event occurrence indicator 505 corresponding to each volume event 217 identified by the volume event determination module 211. Moreover, by adding a new volume event occurrence indicator 505 adjacent a previously existing volume event occurrence indicator 505, the user interface module 225 confirms to the user that the voice recognition application 203 has identified the user's speech as a phrase to be recognized, and not as background noise.

In the illustrated embodiment, the volume event occurrence indicators 505 appear as volume bars 505, each having a height that corresponds to the volume of its associated volume event 217. It should be noted, however, that alternate images could be used as the volume event occurrence indicators 505. For example, some embodiments of the invention may employ a colored circle or square, where the color denotes the volume of the associated volume event 217. Also, a spike could be used as a volume event occurrence indicator 505, where the height or color of the spike corresponds to the volume of the associated volume event 217. Of course, still other arrangements will be apparent to those of ordinary skill in the art. Even further, the appearance of the volume event occurrence indicators 505 can be made independent of the volume of their corresponding volume events 217. With this arrangement, some provision should be made to allow a user to distinguish a new volume event occurrence indicator 505 from a previously existing volume event occurrence indicator 505. For example, display 501 may allow for a variable number of total slots 503, and simply add a new slot 503 for each new volume event occurrence indicator 505.

Operation Of The Speech Recognition Module With The User Interface

As noted above, after the volume event determination module 211 retrieves sound samples from the sound sample buffer 209, it passes those sound samples onto the voice recognition module 213. The voice recognition module 213 then recognizes the speech frames 215 into which the sound samples are grouped. Thus, as the voice recognition application 203 continues to operate, the voice recognition module 213 will eventually recognize each speech frame 215 in the current volume event 217. This process, and the user interface application's response to this process, will now be described with reference to the flowcharts illustrated in FIGS. 4A–4D and the displays shown in FIGS. 5A–5F.

In step 401, the voice recognition module 213 recognizes a speech frame 215 in the current volume event 217, as described in detail above. Next, in step 403, the voice recognition module 213 determines if the current volume event 217 begins a phrase in step 403. For example, if the voice recognition application 203 is being employed to recognize spoken commands, the voice recognition module 213 will compare the sound recognized from the speech frame 215 with the beginning portion of the initial phoneme of each command in the grammar library. If the sound represented by the speech frame 215 corresponds to the first part of one of these initial phonemes, the voice recognition module 213 will recognize that the speech frame 215 is beginning a new phrase.

Similarly, if the voice recognition application 203 is being used to take dictation, the voice recognition module 213 will determine if the sound represented by the speech frame 215 both corresponds to the first part of a phoneme and is occurring after a series of previous speech frames 215 that did not correspond to phonemes, or is occurring after the user has spoken the word "period" or otherwise provided sentence-ending punctuation to indicate the end of a sentence. On the other hand, if the speech frame 215 does not match the first portion of an initial phoneme of a command, or match the first portion of a phoneme after a series of speech frames 215 that did not correspond to phonemes or to a period, then the voice recognition module 213 determines that the speech frame 215 does not begin a new phrase.

If the voice recognition module 213 determines that the speech frame 215 starts a new phrase in step 403, then, in step 405, the voice recognition module 213 issues a phrase start notification to the phrase start/end module 223 via the speech API 205. Next, in step 407, the voice recognition module 213 determines if the speech frame 215 represents the end of a phrase. As noted above, if the user is speaking a command, then the voice recognition module 213 determines that the phrase being spoken has ended when it recognizes a speech frame 215 that matches the ending portion of the last phoneme for the command in the grammar library. For dictation, the voice recognition module 213 may determine that the phrase being spoken has ended after a prolonged period of non-speech activity (for example, after 1.5 seconds of silence), or after the user has spoken the word "period" to dictate punctuation or otherwise provided sentence-ending punctuation.

If the speech frame 215 does represent the end of a phrase, then, in step 409, the voice recognition application 203 determines if the entire phrase was properly recognized. Then, in step 411, the voice recognition application 203 sends a phrase recognition notification to the phrase start/end module 223 by way of the speech API 205. In the illustrated embodiment, this phrase recognition notification both notifies the phrase start/end module 223 that the phrase has ended, and whether the phrase was accurately recognized. For example, if the phrase was correctly recognized, then the phrase recognition notification may include the text or command recognized from the phrase.

In response to this notification, in step 413 the user interface module 225 may display a phrase end indicator in the display 501. Thus, if the voice recognition application 203 has accurately recognized a phrase, then the text or command recognized from the phrase may be displayed to the user. For example, if the voice recognition application 203 is being used to recognize a command, then the user interface module 225 may display that recognized command in the display 501. Alternately, if the voice recognition application 203 is being used to recognize text for insertion into another application (such as a word processing application), then the user interface module 225 may render the recognized text in that application. Still further, the user interface module 225 may display a generic indicator stating that the phrase has been recognized. Thus, the user interface module 225 may alternately or additionally display a non-text indicator to inform the user that the phrase was properly recognized, such a green frame surrounding the display 501.

On the other hand, if the voice recognition application 203 has not accurately recognized the spoken phrase, then the user interface module 225 may display a generic indicator informing the user that the phrase was not recognized. For example, the user interface module 225 may display the words "please repeat," "I didn't catch that," or "please say that again" in the display 501. Alternately, or additionally, the user interface module 225 may display a non-text indicator to inform the user that the phrase was not properly recognized, such a red frame surrounding the display 501.

After the speech recognition indicator has been displayed for a sufficient amount of time, the user interface 225 may clear all existing volume event indicators from the display 501. Then, in step 427, the process illustrated in FIGS. 4A–4D is repeated for each speech frame 215 in a new phrase spoken by the user. Of course, with other embodiments of the invention, the user interface 225 may continue to display the existing volume event indicators until a new phrase is started, or even continue to add volume event indicators corresponding to background noise or silence until the user begins speaking a new phrase.

If the speech frame 215 does not end a phrase, then in step 415 the speech recognition module 213 determines if the speech frame 215 ends the current volume event 217 (that is, it determines if the speech frame 215 is the last speech frame in the current volume event 217). If it is not, then the recognition results for the speech frame 215 are stored for future use with the recognition results for preceding and subsequent speech frames 215, and in step 427 the process shown in FIGS. 4A–4D is repeated with the next speech frame 215 in the current volume event 217. If, however, the speech frame 215 is the last speech frame 215 in the current volume event 217, in step 417 the voice recognition module 213 determines if it has provided a phrase start notification to the phrase/start end module 223.

If the voice recognition module 213 determines that it has not yet provided a phrase start notification to the phrase/start end module 223, then the recognition results for the speech frame 215 are stored for future use with the recognition results for preceding and subsequent speech frames 215, and in step 427 the process shown in FIGS. 4A–4D is repeated with the next speech frame 215 in the current volume event 217. If, however, the voice recognition module 213 has provided a phrase start notification to the phrase/start end module 223, then in step 419 it provides a volume event recognition notification to the volume event recognition module 221 in the user interface application 207.

Accordingly, the volume event recognition module 221 receives the volume event recognition notification reporting the recognition of the current volume event 217 and identifying the current volume event 217. In response, the user interface module 225 determines in step 421 if there is a volume event occurrence indicator 505 rendered in the display 501 corresponding to the current volume event 217. If there is, then in step 423 the user interface module 225 displays a volume event recognition indicator 507 so as to associate that volume event recognition indicator with the volume event occurrence indicator 505 corresponding to the recognized current volume event 217.

For example, as shown in FIG. 5E, when the volume event recognition module 221 receives a recognition notification for the volume event 217c, the user interface module 225 renders a volume event recognition indicator 507c directly below the volume event occurrence indicator 507c corresponding to the volume event 217c. Similarly, when the volume event recognition module 221 subsequently receives a recognition notification for the volume event 217d, the user interface module 225 displays a volume event recognition indicator 507d directly below the volume event occurrence indicator 505d corresponding to the volume event 217d. On the other hand, if a volume event occurrence indicator 505 corresponding to the recognized volume event 217 is no longer present in the display 501, in step 425 the user interface module 225 simply ignores the recognition notification.

Figure 4A:
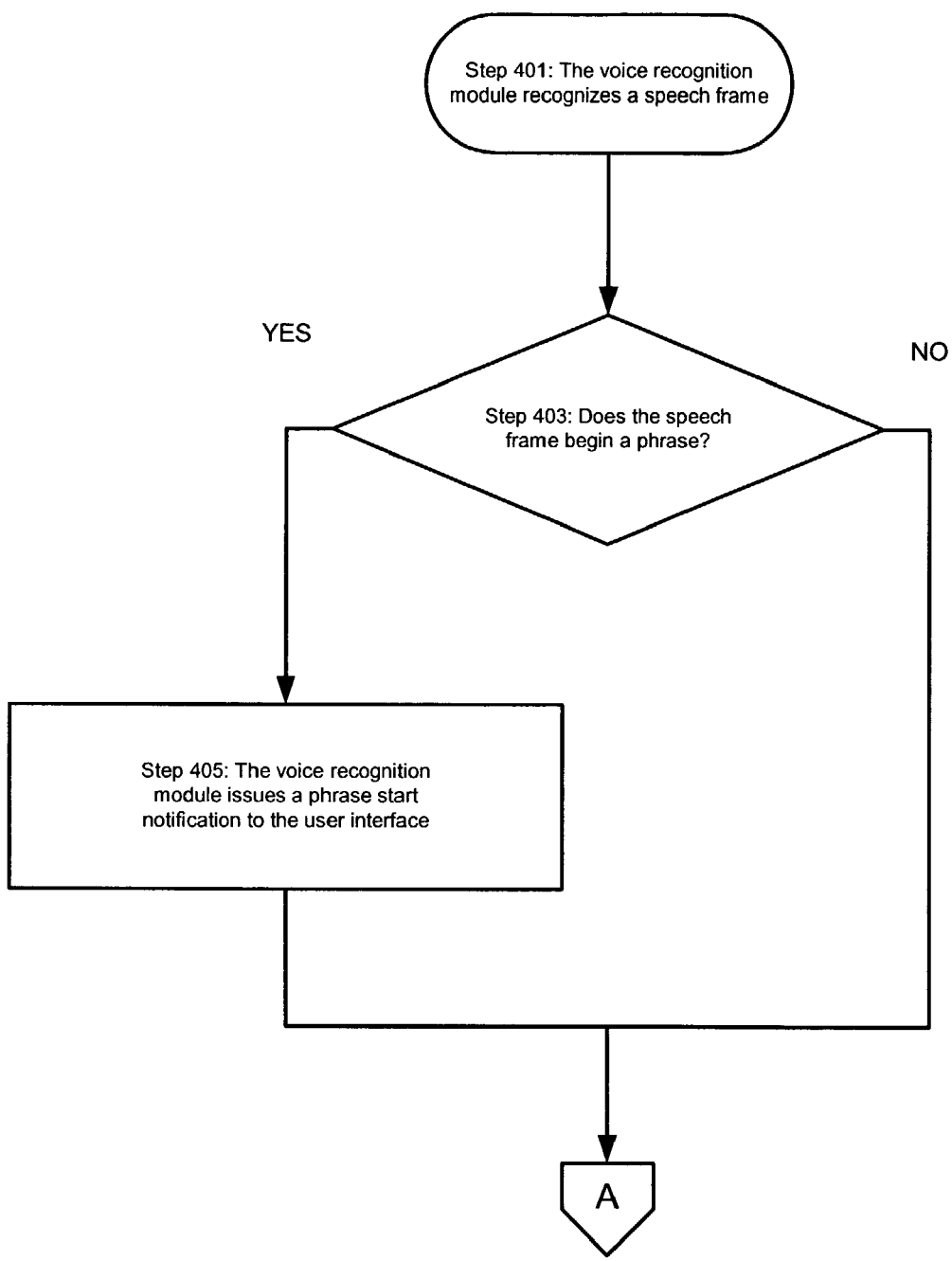
FIGS. 4A–4D show flowcharts illustrating the operation of the voice recognition application illustrated in FIG. 2 with respect to the voice recognition module.
Figure 4B:
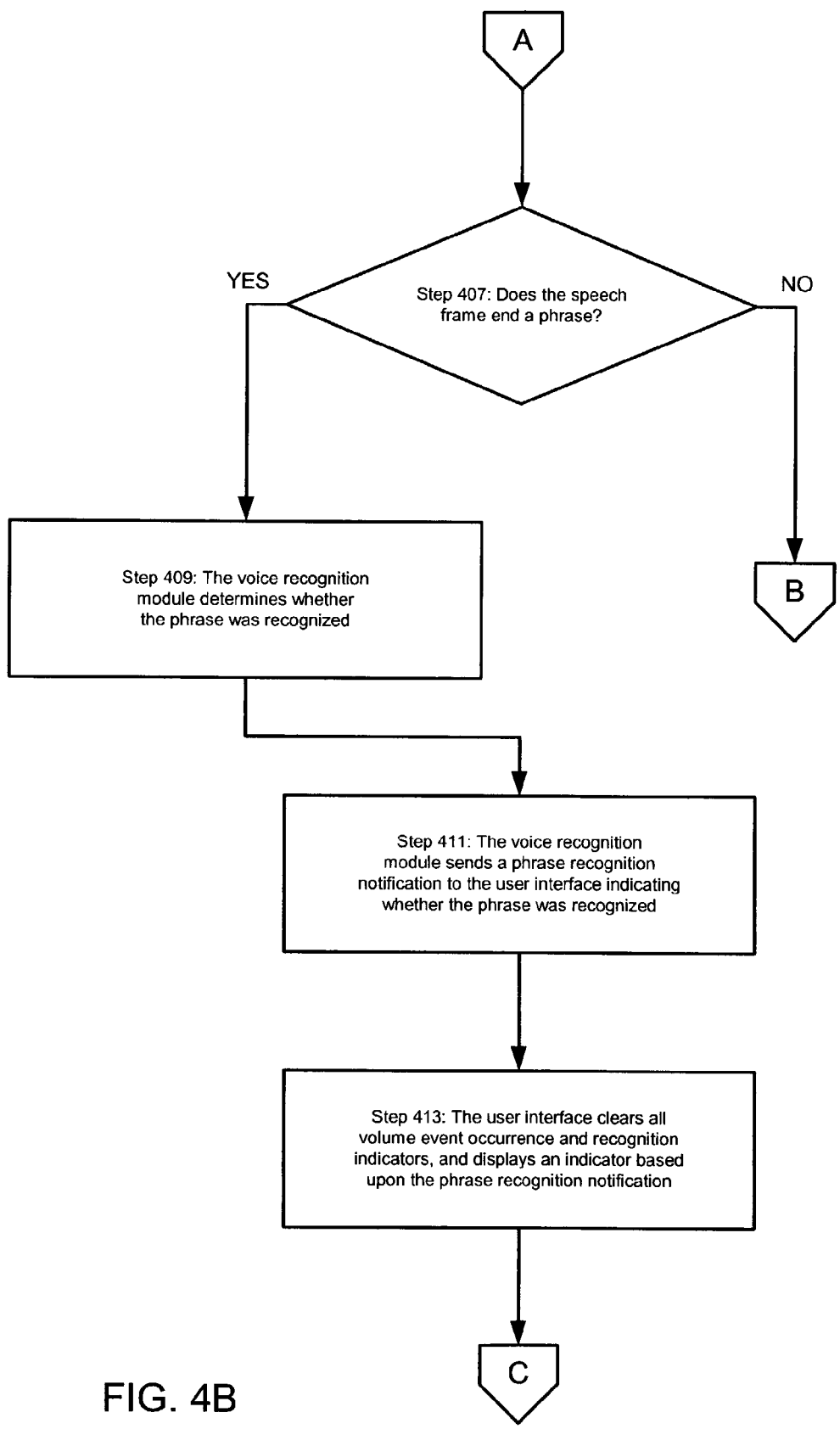
Figure 4C:
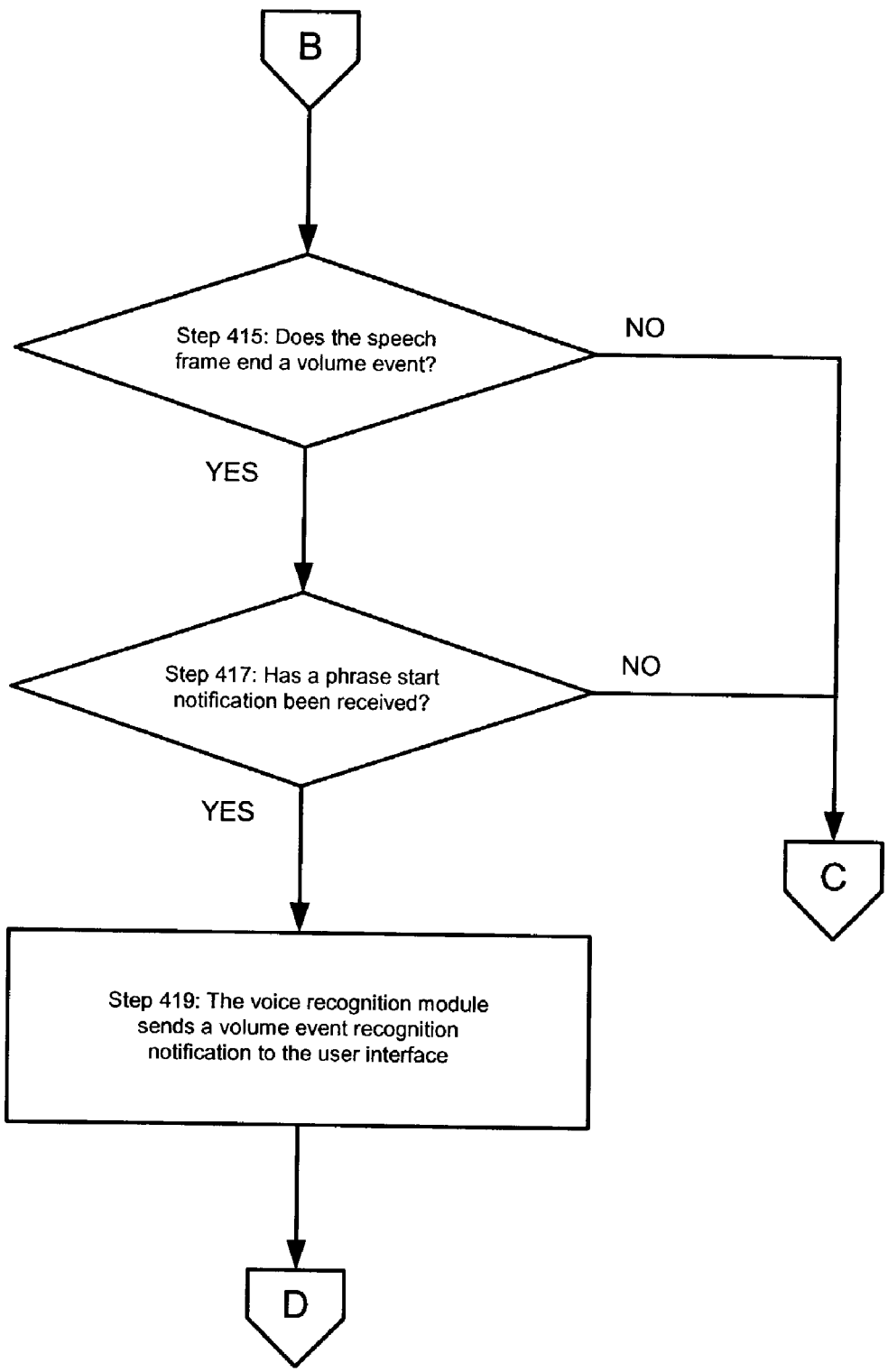
Figure 4D:
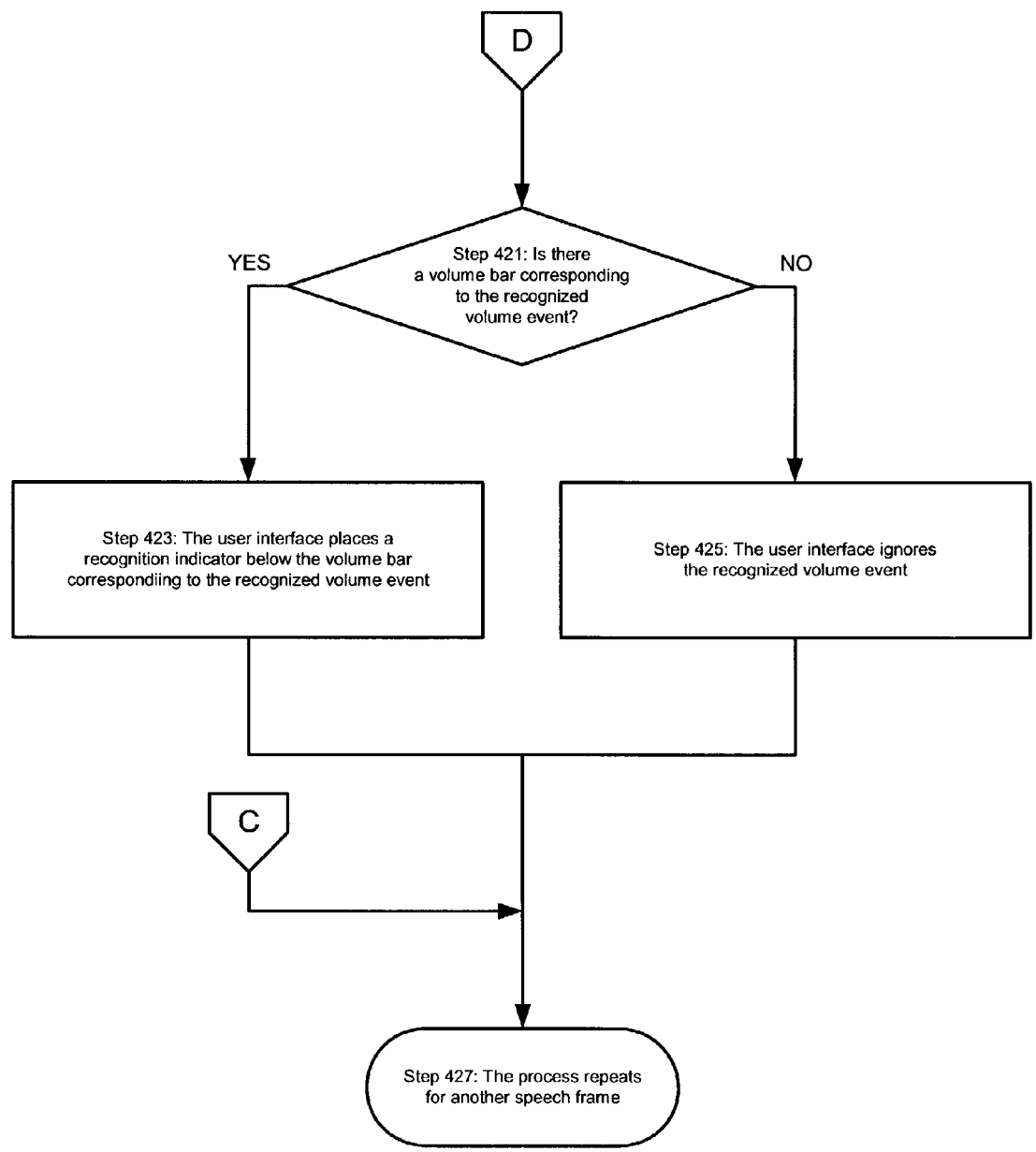

As shown in FIGS. 4D–4F, the volume event recognition indicators 507 may be, for example, a colored square 507, such as a green square. Of course, those of ordinary skill in the art will appreciate that the volume event recognition indicators 507 other appearances may alternately be employed. Thus, the volume event recognition indicators 507 may be shown as circles, spikes, rectangles, or any other shape. Further, while the illustrated volume event recognition indicators 507 do not reflect the volume of the recognized volume event 217, with other embodiments the height or color of the volume event recognition indicators 507 may vary depending upon the volume of the recognized volume event 217.

Still further, with some embodiments of the invention, the color of the volume event recognition indicators 507 may vary depending upon a level of confidence in the recognition of the volume event 217. Also, as previously noted, the volume event occurrence indicators 505 will periodically shift left in the display 501. When his happens, their corresponding volume event recognition indicators 507 are shifted left as well, to ensure that a volume event recognition indicator 507 remains below its associated volume event occurrence indicator 505.

By placing a recognition indicator 507 below an occurrence indicator 505 corresponding to a volume event 217, the user interface application 207 of the invention informs the user that a previously spoken group of sounds has just been recognized. This provides the user with an update as to the operation of the voice recognition application 203. More particularly, the delay between the display of the volume event occurrence indicator 505 for a group of sounds and the display of the volume recognition indicator 507 for that group of sounds gives the user a graphical indication as to the delay in the operation of the voice recognition application 203.

The operation of the invention was described above with respect to the processing of a single volume event 217 by the volume event determination module 211 and the voice recognition module 213. In actuality, however, the recognition application 203 may be continuously identifying and recognizing volume events 217. That is, while the volume event determination module 211 is identifying one volume event 217, the voice recognition module 213 may simultaneously be recognizing speech frames 215 from an earlier-identified volume event 217. Similarly, the microphone 201 will continue to record new sound samples while previously recorded sound samples are being identified as volume events 217 by the volume event determination module 211 and recognized in units of speech frames 215 by the speech recognition application 203. Accordingly, as the user begins to speak a phrase, the user interface application 207 may receive one or more volume event occurrence notifications before receiving a volume event recognition notification.

For the same reason, once the user stops speaking, the user interface application 207 may continue to receive one or more volume event recognition notifications before receiving a new volume event occurrence notification.

Conclusion

As will be apparent from the foregoing description, the user interface according to the invention provides a user with a graphical indication of the status of the operation of a voice recognition application. More particularly, the user interface confirms to a user that the voice recognition application is recording sounds, even before the user begins speaking a phrase. The user interface likewise confirms to the user that the voice recognition application is recognizing the user's speech. Further, it provides the user with a real-time indication as to the delay the voice recognition application is experiencing in recognizing the user's speech.

Although the invention has been defined using the appended claims, these claims are exemplary in that the invention may include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

What is claimed is:

1. A method of displaying the status of a voice recognition process, comprising:
   receiving a volume event determination notification from a voice recognition application, the volume event determination notification corresponding to a volume event;
   in response to receiving the volume event determination notification, displaying a volume event occurrence indicator;
   receiving a volume event recognition notification from the voice recognition application, the volume event recognition notification notifying that the volume event has been recognized,
   in response to receiving the volume event recognition notification, displaying a volume event recognition indicator so as to associate the volume event recognition indicator with the volume event occurrence indicator;
   receiving a second volume event determination notification from a voice recognition application, the second volume event determination notification corresponding to a second volume event;
   in response to receiving the second volume event determination notification, displaying a second volume event occurrence indicator;
   receiving a second volume event recognition notification from the voice recognition application, the second volume event recognition notification notifying that the second volume event has been recognized, and
   in response to receiving the second volume event recognition notification, displaying a second volume event recognition indicator so as to associate the second volume event recognition indicator with the second volume event occurrence indicator.

2. The method recited in claim 1, wherein displaying the volume event recognition indicator includes:
   determining if the volume event occurrence indicator is still being displayed, and
   if the volume event occurrence indicator is still being displayed, displaying the volume event recognition indicator adjacent to the volume event occurrence indicator; and
   if the volume event occurrence indicator is not still being displayed, not displaying the volume event recognition indicator.

3. The method recited in claim 1, further comprising:
   receiving a third volume event determination notification from the voice recognition application before receiving the second volume event recognition notification, the third volume event determination notification corresponding to a third volume event;
   in response to receiving the third volume event determination notification, displaying a third volume event occurrence indicator before displaying the second volume event recognition indicator.

4. The method recited in claim 1, wherein the volume event recognition indicator is a square.

5. The method recited in claim 1, wherein a color of the volume event recognition indicator corresponds to a confidence level in the recognition of the volume event.

6. The method recited claim 1, further comprising:
   determining if the voice recognition application has provided a phrase start notification indicating that a user has started speaking a phrase, and
   if the voice recognition application has provided a phrase start notification, displaying the second volume event occurrence indicator adjacent to the first volume event occurrence indicator, and
   if the voice recognition application has not provided a phrase start notification, displaying the second volume event occurrence indicator in place of the first volume event occurrence indicator.

7. The method recited in claim 6, further comprising displaying the second volume event occurrence indicator to the right of the first volume event occurrence indicator.

8. The method recited in claim 1, further comprising:
   receiving a phrase end notification from the voice recognition application notifying of the end of a phrase; and
   in response to receiving the phrase end notification, displaying a phrase end indicator.

9. The method recited in claim 8, wherein
   the phrase end indicator indicates whether the phrase was accurately recognized by the voice recognition application.

10. The method recited in claim 1, wherein the volume event occurrence indicator is a bar.

11. The method recited in claim 10, wherein a height of the bar corresponds to a volume of the volume event.

12. The method recited in claim 10, wherein a color of the bar corresponds to a volume of the volume event.

13. An apparatus for displaying the status of a voice recognition application, comprising:
   a volume event notification module tat receives a notification from the voice recognition application when a volume event is determined;

a volume event recognition module that receives a notification from the voice recognition application when a volume event is recognized; and a user interface module that displays a volume event occurrence indicator in response to the volume event notification module receiving a notification from the voice recognition application, and in response to the volume event recognition module receiving the notification from the voice recognition application that a volume event has been recognized, determines if the volume event occurrence indicator for the recognized volume event is being displayed, and if a volume event occurrence indicator for the recognized volume event is being displayed, displays a volume event volume event recognition indicator so as to associate volume event volume event recognition indicator with the volume event occurrence indicator.

14. The apparatus recited in claim 13, further comprising:
a phrase start module that receives a notification from the voice recognition application when the voice recognition application recognizes the start of a phrase.

15. The apparatus recited in claim 14, wherein the user interface module displays only a single volume event occurrence indicator at any time until the phrase start module receives a notification from the voice recognition application that the voice recognition application has recognized the start of a phrase.

16. The apparatus recited in claim 13, further comprising:
a phrase end module that receives a notification from the voice recognition application when the voice recognition application recognizes the end of a phrase.

17. The apparatus recited in claim 16, wherein the user interface module displays a phrase end indicator in response to the phrase end module receiving a notification from the voice recognition application.

18. A voice recognition system, comprising:
a voice recognition application for determining and recognizing volume events; and a user interface application that displays a volume event occurrence indicator when the voice recognition application determines a volume event;

if the volume event occurrence indicator is still displayed when the voice recognition application recognizes the volume event, displays a volume event recognition indicator so as to associate the volume event recognition indicator with volume event occurrence indicator, and includes a volume event notification module that receives a notification from the volume event determination module when the volume event determination module determines the volume event;

a volume event recognition module that receives a notification from the voice recognition application when the volume event is recognized; and a user interface module that displays a volume event occurrence indicator in response to the volume event notification module receiving a notification from the volume event determination module, and in response to the volume event notification module receiving the notification from the voice recognition module, determines if the volume event occurrence indicator for the recognized volume event is being displayed, and if a volume event occurrence indicator for the recognized volume event is being displayed, displays a volume event recognition indicator so as to associate the volume event recognition indicator with the volume event occurrence indicator.

19. The recognition system recited in claim 18, wherein the voice recognition application includes a volume event determination module for determining the volume event from one or more recorded sound samples, and a voice recognition module for recognizing the volume event.

20. The apparatus recited in claim 18, wherein the user interface application further includes a phrase start module that receives a notification from the voice recognition application when the voice recognition application recognizes the start of a phrase.

21. The apparatus recited in claim 20, wherein the user interface module displays only a single volume event occurrence indicator at any time until the phrase start module receives a notification from the voice recognition application that the voice recognition application has recognized the start of a phrase.

22. The apparatus recited in claim 18, wherein the user interface application further includes a phrase end module that receives a notification from the voice recognition application when the voice recognition application recognizes the end of a phrase.

23. The apparatus recited in claim 22, wherein the user interface module displays a phrase end indicator in response to the phrase end module receiving a notification from the voice recognition application.

* * * * *